US010065113B1

(12) United States Patent
Mostovoy

(10) Patent No.: US 10,065,113 B1
(45) Date of Patent: Sep. 4, 2018

(54) VIRTUAL REALITY SYSTEM WITH ENHANCED SENSORY EFFECTS

(71) Applicant: Gary Mostovoy, Brooklyn, NY (US)

(72) Inventor: Gary Mostovoy, Brooklyn, NY (US)

( * ) Notice: Subject to any disclaimer, the term of this patent is extended or adjusted under 35 U.S.C. 154(b) by 0 days.

(21) Appl. No.: 14/998,696

(22) Filed: Feb. 3, 2016

Related U.S. Application Data

(60) Provisional application No. 62/176,022, filed on Feb. 6, 2015.

(51) Int. Cl.
*A63F 13/285* (2014.01)
*G06T 19/00* (2011.01)
*G06F 3/01* (2006.01)

(52) U.S. Cl.
CPC ............ *A63F 13/285* (2014.09); *G06F 3/016* (2013.01); *G06T 19/006* (2013.01)

(58) Field of Classification Search
None
See application file for complete search history.

(56) References Cited

U.S. PATENT DOCUMENTS

| 8,113,517 | B2 * | 2/2012 | Canterbury | G07F 17/32 273/138.1 |
| 9,478,067 | B1 * | 10/2016 | Worley, III | G06F 3/016 |
| 2008/0054561 | A1 * | 3/2008 | Canterbury | G07F 17/32 273/148 B |
| 2008/0059138 | A1 * | 3/2008 | Tremblay | G06F 3/011 703/11 |
| 2009/0276940 | A1 * | 11/2009 | Sallee | A42B 3/24 2/435 |
| 2012/0229699 | A1 * | 9/2012 | Mate | H04N 5/2256 348/370 |
| 2013/0160195 | A1 * | 6/2013 | Clement | A42B 3/286 2/437 |
| 2014/0333450 | A1 * | 11/2014 | Savage, Jr. | G08B 5/38 340/815.45 |
| 2014/0333773 | A1 * | 11/2014 | Davis | H04N 5/2252 348/158 |
| 2016/0171739 | A1 * | 6/2016 | Anderson | G06T 11/60 345/633 |

OTHER PUBLICATIONS

Author: Alex; Title:"FeelReal VR Mask will be available this summer for Virtual Reality", Mar. 15, 2015, source: http://riftinfo.com/feelreal-vr-mask-will-be-available-this-summer-for-virtual-reality.*
Author: Oculus VR, LLC; Title: "DK2: Development Kit 2—Quick Start Guide", Jul. 25, 2014, source: https://static.oculus.com/sdk-downloads/documents/Oculus_Rift_DK2_Instruction_Manual.pdf.*

* cited by examiner

*Primary Examiner* — Jwalant Amin

(57) ABSTRACT

A virtual reality (VR) system is implemented as a "feel-real" mask attached to standard VR goggles or as a helmet having an integrated feel-real mask and 3-D goggles. A video stream or a video game is rendered to a user via the 3-D goggles from a mobile device or from a PC over a wireless communication channel. The video stream or the video game code has a plurality of inserted markers indicating feel-real sensory events corresponding to the content of the video or the video game. A feel-real player reads the markers and triggers the events, including a stream of warm or cold air, a water mist (or a spray), vibrations and various smells. Thus, the VR system appeals to different user senses apart from traditional ophthalmoception and audioception (i.e., audio and visual) senses and creates enhanced virtual user experience while watching a movie or playing a game.

13 Claims, 3 Drawing Sheets

VIRTUAL REALITY SYSTEM WITH ENHANCED SENSORY EFFECTS

CROSS-REFERENCE TO RELATED APPLICATION

This application is a non-provisional application of U.S. Provisional Patent Application No. 62/176,022, filed Feb. 6, 2015, entitled FEELREAL VIRTUAL REALITY MULTIMEDIA APPARATUS.

BACKGROUND OF THE INVENTION

Field of the Invention

This invention relates to a virtual reality systems, and more particularly, to a mask and a helmet that create a "feel-real" virtual reality environment by providing enhanced sensory effects to a user.

DESCRIPTION OF THE RELATED ART

A multitude of virtual reality devices have been developed over recent years. Most of these devices are geared towards enhanced audio and video effects, such as 3-D video streaming and surround stereo sound. Some virtual systems employ mechanical simulators in order to create a sensation of movement, vibration and even a loss of gravity. However, these devices are large and cannot be used at home by an individual user. Conventional portable virtual reality devices essentially represent various type of video players implemented inside special goggles or masks for rendering 3-D videos or video games to the users. Examples of these virtual reality masks are Oculus™ Rift, Samsung™ Gear VR, Sony™ Morpheus, Zeiss™ VR One, etc. All of the conventional portable virtual reality devices affect only two of the major human senses—ophthalmoception (sight) and audioception (hearing).

Humans, however, have a multitude of senses. The most used ones are ophthalmoception (sight), audioception (hearing), gustaocсption (taste), olfacoception or olfacception (smell), and tactioception (touch). These are the five traditionally recognized senses. The ability to detect other stimuli beyond those governed by these most broadly recognized senses also exists, and these sensory modalities include thermoception (sense of temperature fluctuations), proprioception (kinesthetic sense), equilibrioception (balance), mechanoreception (vibration), and etc.

However, what constitutes a sense is a matter of some debate, leading to difficulties in defining what exactly a distinct sense is, and where the borders between responses to related stimuli lay. Regardless of definitions of the senses, in reality, a person always experiences certain senses during an intense physical activity (i.e., playing a game or participating in a sport). The most common senses are smells, feeling of a warm or cold air, contact with the water drops or an air mist, and various types of movement-related vibrations. None of these sensations can be experienced by users of the conventional portable VR systems discussed above. The conventional VR helmets or goggles only appeal to the two human senses—sight and hearing. Obviously, this limits the user's virtual experience greatly. In other words, the conventional VR systems provide for a pseudo-virtual experience at best by only involving two of the five major human senses.

Accordingly, a portable virtual reality system, which affects various human senses in addition to conventional ophthalmoception and audioception, is desired.

SUMMARY OF THE INVENTION

Accordingly, the present invention is directed to a mask and a helmet that create feel-real virtual reality environment by providing enhanced sensory effects to a user that substantially obviates one or more of the disadvantages of the related art.

In one aspect of the invention, a virtual reality (VR) system is provided. The VR system is implemented as a feel-real mask attached to standard VR goggles or as a helmet having an in integrated feel-real mask and the goggles. A video or a video game is rendered to a user on a LED display of the 3-D goggles. A video stream or a video game is rendered to a user from a mobile device or from a stationary PC over a wireless communication channel. The video stream (or the video game) code has a plurality of embedded markers indicating feel-real events corresponding to the content of the video or the video game. The feel-real player running on a mobile device (or on a PC) reads the markers and triggers the sensory events, such as a stream of hot or cold air, a water mist (or a spray), a vibration and various smells. Thus, the VR system appeals to different user senses apart from traditional ophthalmoception and audioception (i.e., audio and visual) senses and creates enhanced virtual experience for a user wearing the feel-real mask (or a helmet) while watching a movie or playing a game.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
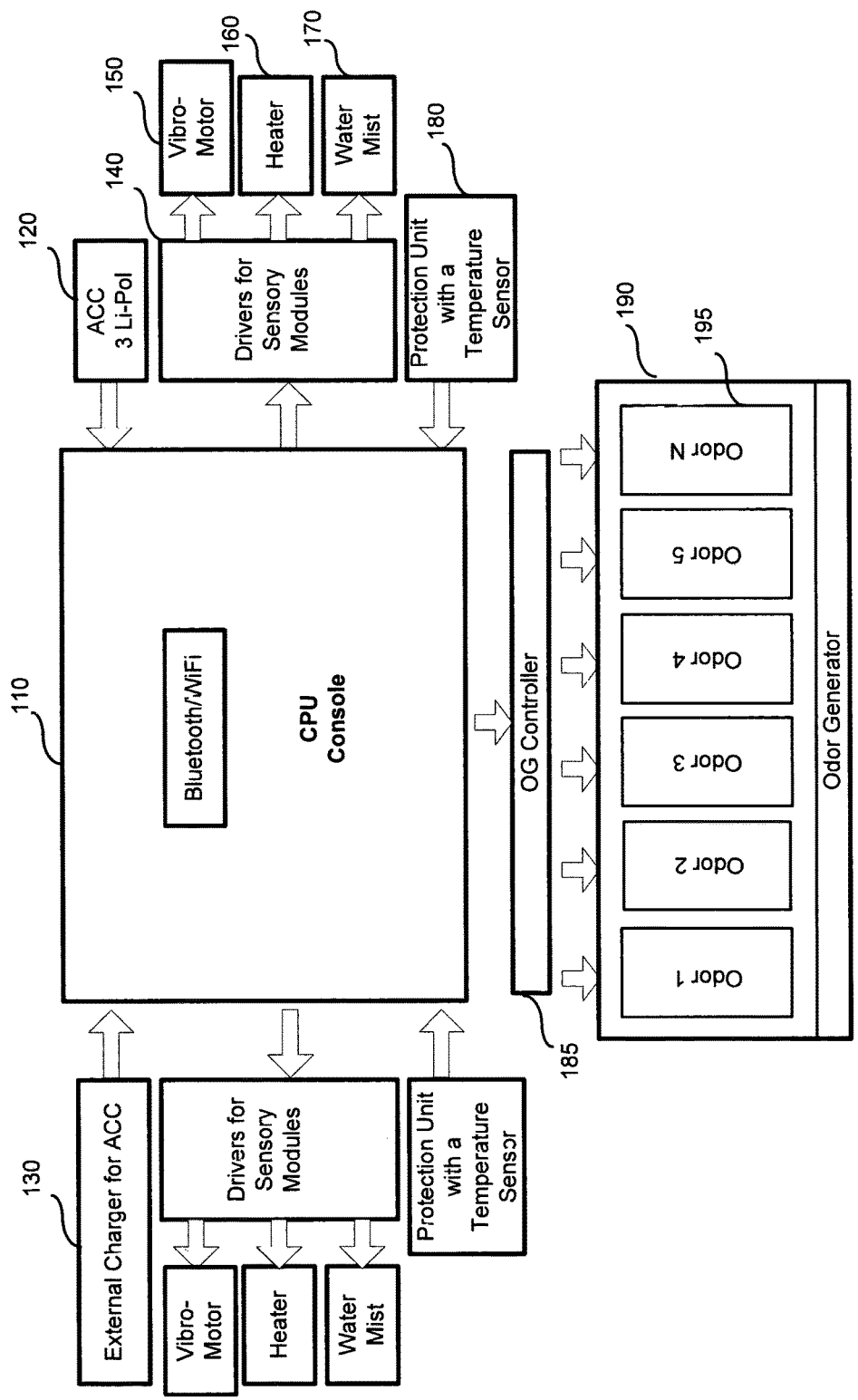
FIG. 1 illustrates an architecture of a virtual reality system, in accordance with the exemplary embodiment.

Reference will now be made in detail to the preferred embodiments of the present invention, examples of which are illustrated in the accompanying drawings.

In one aspect of the invention, a virtual reality (VR) system is provided. The VR system is implemented as a feel-real mask attached to standard VR goggles or as a helmet having an in integrated feel-real mask and the goggles. The video stream or a video game is rendered to a user on a LED display of standard 3-D goggles, such as, for example Oculus™ Rift, Samsung™ Gear VR, Sony™ Morpheus, Zeiss™ VR One, etc. The video stream or the video game is rendered to user 3-D goggles from a mobile device or from a PC over a wireless communication channel (e.g., Bluetooth or Wi-Fi).

According to an exemplary embodiment, the VR mask (or helmet) receives control commands from a proprietary multi-media "feel-real" player running on a mobile device (e.g., a SmartPhone or a tablet) or on a stationary PC. The commands are generated by the feel-real player when the content (e.g., video clips, movies or video games, etc.) is played. The commands are sent to the VR mask (or helmet) from the feel-real player over Wi-Fi or Bluetooth communication channels. According to the exemplary embodiment, special "feel-real" markers are added to a video file or to the code of the video game.

The markers reflect a "feel-real" effect such as a warm or cold wind, a water mist or a spray, a vibration, a smell or a combination of smells. For example, the markers can be inserted into a file such as ".mkv," ".mpeg," ".mp4," etc. The markers are inserted into the video or the video game content at the positions where the feel-real sensory events need to be generated. For example, an explosion can produce a stream of hot air, a vibration and a burning smell. Thus, a marker embedded into the source content at the place of the explosion is read by the feel-real real player, and a corresponding control command or series of the control commands are sent to the VR system.

In one embodiment, the source file has to be pre-processed (or encoded) for insertion of the feel-real markers. This can be done by the developers of the game using a proprietary Software Developer Kit (SDK) provided by a vendor of the proposed VR system. In one embodiment, a special plug-in can be integrated into a game engine for processing the sensory events corresponding to the content of the game. According to the exemplary embodiment, the markers have the following structure consisting of for fields:

- a header consist of 3 ASCII characters "FRM" that indicate to the feel-real player that it needs to read metadata reflecting parameters of the control command to be sent to a sensory device of the VR system;
- a time field indicating the time point when the command needs to be sent to the VR system;
- a metadata field indicating a name of a sensory module and parameters of the sensory event to be generated by this module; and
- a marker end field indicating that reading of the marker is completed and CRLF (Carriage Return and Line Feed).

For example, a time field can have the following structure 00:00:10.880. The metadata field contains a command to actuate a sensory module including the parameters of the event to be generated by this module, such as, for example:

- a command 11-25-1.500 indicates to turn on the left fan to 25% of its capacity for 1.5 second;
- a command 12-50-2.500 indicates to turn on the right fan to 50% of its capacity for 2.5 seconds;
- a command 13-100-5.000 indicates to turn on the right fan and the left fan to 100% of their capacity for 5 seconds;
- a command 14-50-2.500 indicates to turn on the fan of the order generator module to 50% of its capacity for 2.5 seconds;
- a command 51-100-2.500 indicates to turn on the first odor vaporizer to 100% of its capacity for 2.5 seconds; and
- a command 56-100-3.500 indicates to turn on the 6th odor vaporizer to 100% of its capacity for 3.5 seconds.

Note that in this example, the numbers 1-17 indicate the control commands for the fans, while the numbers 51-56 are commands directed to the odor generator, etc. In case when more than one commands are included into the same feel-real marker, the command are separated by a comma. For example, the marker with three commands can look as:

FRM; 00:00:05.555;11-25-1.500,51-100-2.500,14-100-3.500;CRLF

Thus, the feel-real markers reflect the nature, intensity and duration of the sensory effect(s) to be generated.

In one embodiment, manual insertion of the feel-real markers into the content of the source content can be replaced by an automated generation of the feel-real markers by a special proprietary marker generation player, which writes these markers into an external file (e.g., ".frp" file). This way the source file is not affected. The ".frp" file contains the markers defining the sensory events that need to be triggered and the synchronization metadata indicating duration of the sensory events triggered by the markers and the points when each marker is read by the feel-real player. Note that the feel-real player needs to be configured to read the markers out of the separate file instead of the source file.

According to one embodiment, the feel-real markers are automatically generated by a special content analyzer application, which analyzes the content and determines the sensory effects required based on the specifics of the content. Note that in case of using the markers embedded into the source file, the source file needs to be pre-process (i.e., encoded) prior to being played by the feel-real player. In case of video games, a special proprietary plug-in can be integrated into the game engine. This way, the plug-in can determine what sensory event is required on the fly. The plaguing can "guess" what sensory events need to be actuated based on its interaction with the game engine. The plug-in receives the game situation data from the game engine and sends the commands to the VR system drivers for actuating the feel-real modules. The commands can define the duration and other parameters of the event (e.g., an air temperature, intensity of an air flow, intensity of vibration, combination of smells, etc.).

In case of a video clip or a movie, the source video files need to be pre-processed manually or by the marker generation player in order to determine the nature and the location of the feel-real sensory events corresponding to the source file content. Once the source file is pre-processed (i.e., encoded) it can be played by the feel-real player. The feel-real player reads the markers and sends the control commands defined by the markers to the VR system (i.e., to the feel-real mask or to the helmet). Thus, the playback of the source file content and the corresponding events occur simultaneously in real time.

As discussed above, the video stream or the video game code has a plurality of embedded feel-real markers indicating sensory events corresponding to the content of the video or the video game. The exemplary sensory events include a stream of warm or cold air, a water mist (or a spray), a vibration and various smells. Thus, the VR system (i.e., a feel-real mask or a helmet), advantageously, appeals to different user senses apart from traditional ophthalmoception and audioception (i.e., audio and visual) senses and creates enhanced virtual user experience while watching a movie or playing a video game. The user can feel the effects produced by the VR system over a surface of his face and smell the odors accompanying these effects.

FIG. 1 illustrates an architecture of a virtual reality system (e.g., a mask or a system integrated into a helmet), in accordance with the exemplary embodiment. The VR system includes a CPU console 110 configured to receive control commands from a remote device such as a SmartPhone, a tablet or a PC over a wireless channel such as Bluetooth or Wi-Fi. A proprietary feel-real player is installed and running on the remote device (not shown). The feel-real player sends the control commands to the CPU console 110. The CPU console decodes the control commands and activates appropriate sensory modules for execution of the control instructions in order to generate the feel-real sensory events.

According to the preferred embodiment, the VR system includes two user protection units 180 equipped with the temperature sensors configured to control the micro-heaters 160. The micro-heaters 160 include temperature settings. In one embodiment, the high-speed fans generate cold wind flows. The water mist modules 170 include a container with distilled water and an ultrasonic water spray unit. The water mist modules 170 are designed to emulate a water spray or a rain. The exemplary VR system also includes two vibro-motors 150 designed to emulate hits or vibrations. The vibro-motors 150 can have adjustable levels of vibration.

According to the preferred embodiment, the VR system includes an odor generator 190. The odor generator 190 includes removable vaporizer cartridges 195 with unique odors for emulation of different smells. The exemplary odor generator 190 uses a minimum of seven removable vaporizer cartridges 195. However, an arbitrary number of the vaporizer cartridges can be used. The odors are made under strict quality control guidelines. Only natural ingredients are used to produce safe smells for the proposed VR system. For example, the smells such as jungle, burning rubber, flowers, ocean, fire, gunpowder and aphrodisiacs can be used. However, additional or replacement odor cartridges can be provided for the odor generator 190 based on the requirements of a source video or a video game. A user can easily replace the odor cartridges depending on the content of a game or a movie.

The odor generator 190 includes a controller 185, which can identify the odors based on the unique identifiers assigned to each type of the odor cartridge. Once the controller 185 receives the control command from the CPU console 110, it activates a particular vaporizer (or a set of the vaporizers in case of a complex combination of odors) for a duration indicated in the control command. At the same time, a special fan integrated inside the odor generator is activated by the controller 185, so the odor vapor is delivered to a user through a passage located in front of the user's nose inside the mask (or inside the helmet). Note that the odor generator fan operates a little longer than the duration of the odor discharge from the vaporizer. This is required so that the odor is cleared (i.e., blown out) from the mask after the sensory event is over.

According to the exemplary embodiment, drivers 140 are implemented on the CPU console 110. These drivers 140 receive the control commands from the CPU and control the respective sensory modules 150, 160 and 170, as well as the OG controller 185. In one embodiment, the same driver can be used for controlling the identical sensory modules located on both sides of the mask—e.g., one driver can control both micro-heaters, or one driver can control both water dispensers.

The user protection units 180 equipped with temperature sensors are coupled to the respective micro-heaters 160. The micro-heaters 160 can operate in different modes defined by the feel-real marker and, subsequently, by the control command received by the respective driver 140. The exemplary operation modes are "low heat," "medium heat" and "high heat." If the micro-heater 160 is activated in a "high heat" mode, the user protection units 180 are automatically activated in order to monitor the air temperature using the integrated sensors. If the temperature reaches a certain potentially damaging to the user's skin level, the protection units 180 turn off the micro-heaters 160 in order to protect the user from unpleasant sensations or from potential minor skin burns resulting from overheating of the mask (or the helmet). Alternatively, the user protection units 180 can be activated at all times during the operation of the VR system.

According to the exemplary embodiment, all sensory modules 150, 160 and 170 can be activated in parallel or individually. For example, only right or left micro-heater 160 can be actuated at a time based on the requirements of the sensory event defined by the feel-real marker. Same goes for the vibro-motors 150 and the water dispensing units 170. In other words, if the source content requires that a user must experience a particular sensory event only on one side of his/her face, it is reflected in the corresponding feel-real marker and only one of the two sensory modules is actuated at a time.

The VR system, in accordance with the exemplary embodiment, uses a built-in rechargeable battery 120 (e.g., 3 Li-Pol), which provides for up to four hours of a continuous work. The battery can be charged by an external charger 130. The VR system includes a built-in Bluetooth microphone (not shown) for multi-player games.

According to the exemplary embodiment, a proprietary feel-real player application is installed on a Smartphone (or a tablet or user PC). The feel-real player is configured to playback 3D-videos to be rendered through VR goggles, such as, for example, Samsung™ Gear VR. The feel-real player is also configured to read the feel-real markers discussed above and to send the corresponding commands to the VR system CPU console 110 for triggering the sensory events defined by the feel-real markers in real-time.

In one embodiment, a proprietary video processing application (e.g., a player) is installed on a PC. This application is configured to convert 2-D video content into 3-D and to create and edit an external file (e.g., ".frp" file) containing the feel-real markers. An SDK can be provided to the developers for Unreal Engine 4 or any other existing or future game engines. According to the exemplary embodiment, a feel-real player can be installed on any existing or future SmartPhone or tablet. The feel-real player can be controlled by standard means provided by the VR goggles. For example, in case of Samsung™ Gear VR, touchpad, back key and volume key can be used.

Figure 2:
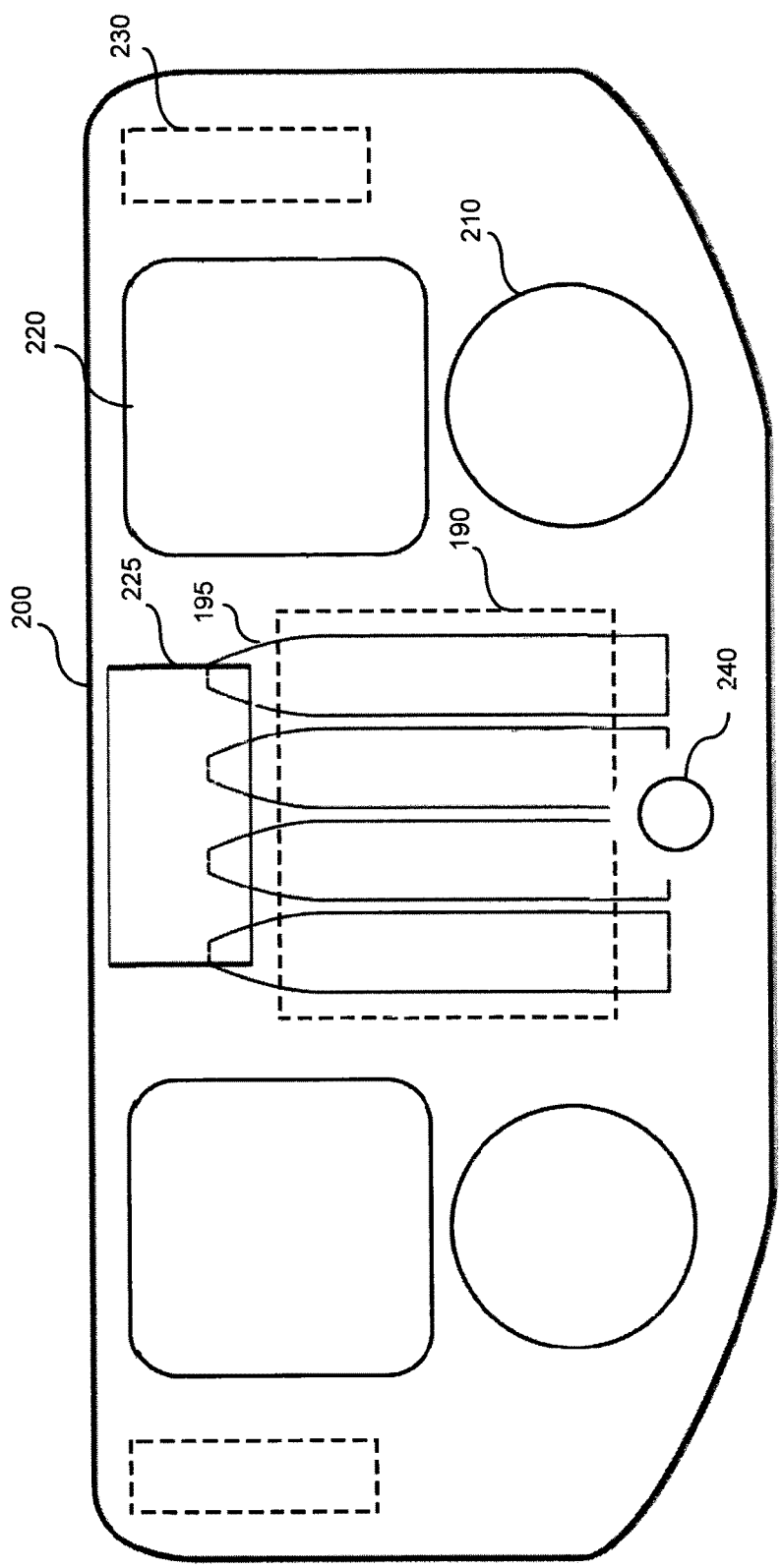
FIG. 2 illustrates VR mask assembly, in accordance with the exemplary embodiment.

FIG. 2 illustrates VR mask assembly, in accordance with the exemplary embodiment. The VR mask 200 is shown from the side, which faces a user. This mask 200 can be used as an attachment to the 3-D goggles. In another implementation, the mask 200 can be attachable to a VR helmet or it can be integrated into the VR helmet. The proprietary VR helmet can provide additional feel-real effects that are not subject to this disclosure.

According to the exemplary embodiment, the VR mask 200 has a built-in microphone 240 located across from user's mouth. The odor generator 190 with removable vaporizer cartridges 195 (not visible to the user) are coupled to a special fan outlet 225 located accords the user's nose for discharging the smell. The water dispenser outlets 220 are located next to the upper portion of the user's face on both sides for dispensing water spray or mist onto the user's face. The cold or warm air outlets 210 are located next to the lower portion of the user's face on both sides. The vibration pads 230 coupled to the vibro-motors are located on both sides of the mask 200 next to the user's upper jaw areas.

Figure 3:
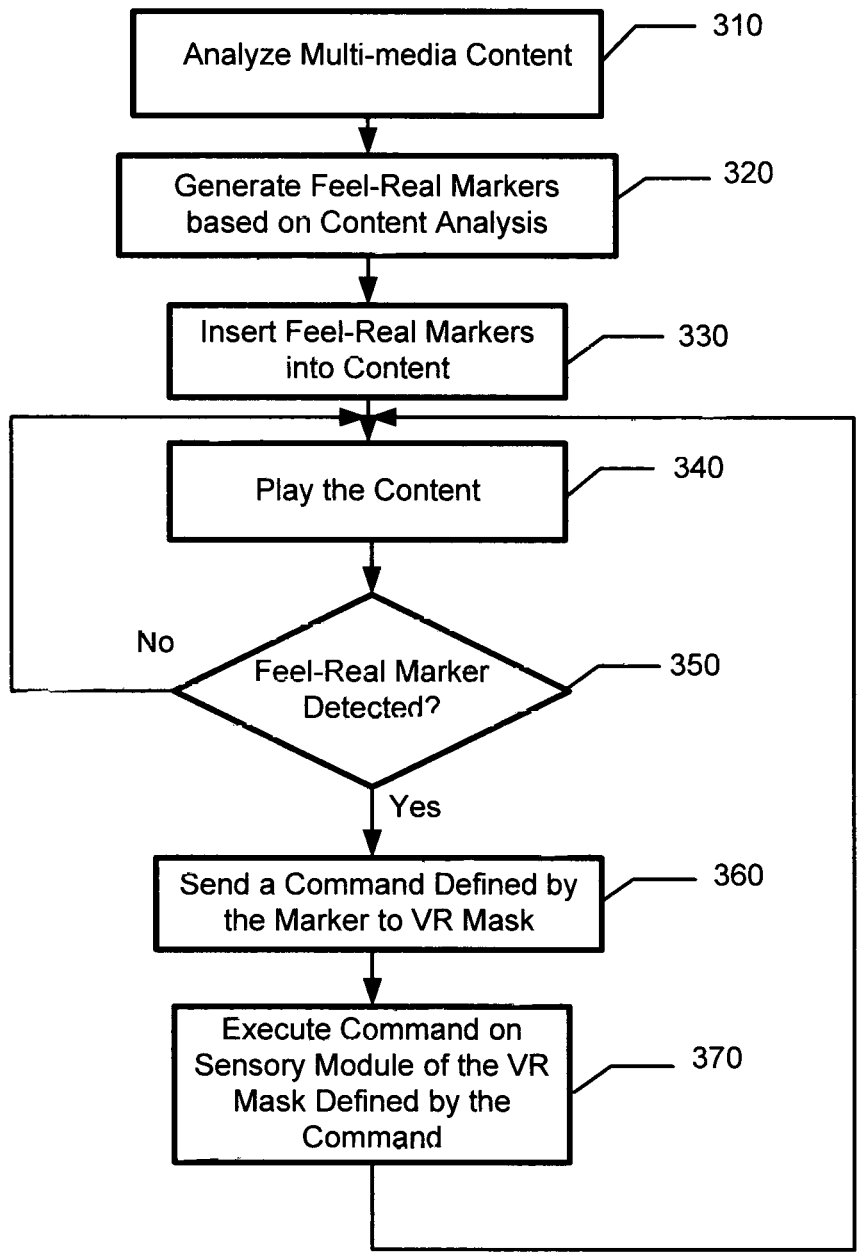
FIG. 3 illustrates a flow chart of a method for providing sensory events to a user, in accordance with the exemplary embodiment.

FIG. 3 illustrates a flow chart of a method for providing virtual reality events to a user, in accordance with the exemplary embodiment. In step 310, a developer (using a special SDK) analyzes multi-media content for sensory events of interest corresponding to the events within the multi-media content. Alternatively, the content analysis can be performed by a special application (i.e., player), as discussed above. In step 320, the feel-real markers are generated based on the content analysis. Then, in step 330, the feel-real markers are inserted into the content, and, in step 340, the content is played in the proprietary player capable of reading the feel-real markers.

If a feel-real marker is detected in step 350, the player reads the fields of the marker and sends a control command defined by the marker to a VR mask in step 360. Then, the command is executed on the VR mask by actuating a VR sensory module defined by the command in step 370. As discussed above, the command defines the sensory module to be actuated and the parameters of the event to be generated by this module, such as, for example, intensity, duration and a side of the mask where the event takes place. After the step 370, the player continues to play the content until it discovers another feel-real marker.

Having thus described a preferred embodiment, it should be apparent to those skilled in the art that certain advantages of the described apparatus have been achieved. In particular, those skilled in the art will appreciate that the proposed virtual reality system enhances a virtual reality environment by affecting user's olfacoception or olfacception, tactioception, as well as thermoception and mechanoreception.

It should also be appreciated that various modifications, adaptations, and alternative embodiments thereof may be made within the scope and spirit of the present invention. The invention is further defined by the following claims.

What is claimed is:

1. A portable virtual reality (VR) system, comprising:
   3-D goggles;
   a mask attached to the 3-D goggles;
   a CPU console implemented on the mask;
   a rechargeable battery integrated into the mask;
   a feel-real player installed on the CPU console;
   a plurality of feel-real modules configured to produce sensory events, the feel-real sensory modules including:
      at least one vibro-motor controlled by a vibro-motor driver, configured to emulate vibrations;
      at least one micro-heater coupled to a high-speed fan configured to produce a stream of warm air;
      at least one water dispensing unit configured to provide a water spray or a mist;
      an odor generator having a plurality of odor vaporizer cartridges configured to emulate different smells;
   an odor generator controller configured to activate the odor vaporizer cartridges upon receiving control commands from the CPU console; and
   a plurality of feel-real module drivers residing on the CPU console configured to control the vibro-motor, the water dispensing unit, the micro-heater and the high-speed fan, respectively, wherein:
   the feel-real player plays a pre-processed multi-media content having a plurality of embedded event markers;
   the feel-real player reads the event markers and sends a control command defined by the event marker to at least one of the feel-real module drivers in real time; and
   the feel-real module driver actuates the corresponding feel-real module in order to trigger a sensory event for an enhanced user virtual experience.

2. The system of claim 1, further comprising at least one user protection unit with a temperature sensor coupled to the micro-heater and configured to turn off the fan and the micro-heater, if temperature reaches a safety threshold value.

3. The system of claim 1, further comprising a helmet with the integrated mask and the 3-D goggles.

4. The system of claim 1, wherein the event marker includes:
   a name of the feel-real module to be activated;
   a time point of sending an activation command to the feel-real module;
   an intensity of the sensory event to be generated by the feel-real module; and
   a duration of the sensory event.

5. The system of claim 1, wherein one event marker defines a plurality of the control commands to be sent to a plurality of the feel-real module drivers and to the order generator controller.

6. The system of claim 1, wherein the pre-processed multi-media content is encoded.

7. The system of claim 6, wherein the multi-media content is automatically encoded by a content analyzer application.

8. The system of claim 7, wherein the content analyzer application generates a plurality of feel-real markers and places them into a separate file.

9. The system of claim 1, wherein the sensory events are any of:
   a warm air stream coming on both sides of a user face;
   a warm air stream coming on one side of a user face;
   a cold air stream coming on both sides of a user face;
   a cold air stream coming on one side of a user face;
   a spray of water dispersed on both sides of a user face;
   a spray of water dispersed on one side of a user face;
   a water mist discharged on both sides of a user face;
   a water mist discharged on one side of a user face;
   a vibration occurring on both sides of a user face;
   a vibration occurring on one side of a user face; and
   a smell discharged inside the mask.

10. The system of claim 9, wherein a combination of the sensory events occurs at the same time.

11. The system of claim 1, wherein the drivers actuate two or more of the feel-real modules simultaneously.

12. The system of claim 1, further comprising a plurality of replaceable odor vaporizer cartridges for selection of odors suitable for a particular multi-media content.

13. The system of claim 1, further comprising a plug-in integrated into the feel-real player and configured to interact with a game engine in order to identify the sensory events on the fly.

* * * * *